United States Patent [19]
Varady et al.

[11] Patent Number: 6,112,149
[45] Date of Patent: Aug. 29, 2000

[54] MISFIRE DETECTION SYSTEM AND METHOD USING RECURSIVE MEDIAN FILTERING FOR HIGH DATA RATE ENGINE CONTROL SYSTEM

[75] Inventors: Arthur Joseph Varady, Chelsea; John Michael Kacewicz, Riverview; Robert Joseph Dalbo, Allen Park, all of Mich.

[73] Assignee: Ford Global Technologies, Inc., Dearborn, Mich.

[21] Appl. No.: 09/340,825

[22] Filed: Jun. 28, 1999

[51] Int. Cl.[7] .................................................. G01M 15/00
[52] U.S. Cl. ..................... 701/111; 73/117.3; 123/406.24
[58] Field of Search ................................... 701/111, 101, 701/102, 110; 73/117.3, 116; 123/406.24, 406.64

[56] References Cited

U.S. PATENT DOCUMENTS

| | | | |
|---|---|---|---|
| 5,105,657 | 4/1992 | Nakaniwa | 73/117.3 |
| 5,508,927 | 4/1996 | Remboski, Jr. et al. | 701/111 |
| 5,509,302 | 4/1996 | Drexel et al. | 73/117.3 |
| 5,515,720 | 5/1996 | Remboski, Jr. . | |
| 5,542,291 | 8/1996 | James . | |
| 5,574,217 | 11/1996 | McCombie | 73/116 |
| 5,576,963 | 11/1996 | Ribbens et al. | 701/111 |
| 5,610,328 | 3/1997 | Magan et al. . | |
| 5,633,456 | 5/1997 | Stander | 73/116 |
| 5,687,082 | 11/1997 | Rizzoni | 701/111 |
| 5,804,711 | 9/1998 | Remboski et al. . | |
| 5,806,014 | 9/1998 | Remboski et al. | 701/111 |
| 5,819,197 | 10/1998 | Fiaschetti et al. | 701/110 |
| 5,824,890 | 10/1998 | Palm et al. | 73/117.3 |
| 5,841,025 | 11/1998 | Remboski et al. | 73/117.3 |
| 5,862,507 | 1/1999 | Wu et al. | 701/111 |
| 6,006,155 | 12/1999 | Wu et al. | 701/111 |

OTHER PUBLICATIONS

G. R. Arce, N.C. Gallagher, and T. A. Nodes, Advances in Computer Vision and Image Processing, vol. 2, ch. 3, pp 90–166 (1986).

Primary Examiner—Henry C. Yuen
Assistant Examiner—Hieu T. Vo
Attorney, Agent, or Firm—Allan J. Lippa

[57] ABSTRACT

An improved misfired detection system and method for high data rate engine control systems. A method of detecting misfires of individual cylinder events in an internal combustion engine is disclosed which includes the step of generating a high data rate velocity signal indicative of the torque behavior of the engine. The velocity signal is then filtered and separated into a plurality of non-interlaced homogeneous data sets wherein each of the data sets represents like portions of the internal combustion engine cycle. A median filter is then applied to each of the plurality of non-interlaced homogeneous data sets. In this manner, the data sets are normalized according to the applied recursive median filter and centered about a relative zero. This centering effect allows the signals to be recombined after filtering, thereby monitoring the nature of any deviations present in the signal. A threshold comparison of the resulting signal is then made to determine whether a misfire has occurred.

12 Claims, 3 Drawing Sheets

MISFIRE DETECTION SYSTEM AND METHOD USING RECURSIVE MEDIAN FILTERING FOR HIGH DATA RATE ENGINE CONTROL SYSTEM

BACKGROUND OF THE INVENTION

The present invention relates in general to detecting misfires occurring during normal operation of an internal combustion engine and, more specifically, to an improved signal processing system and method for detecting misfires in a reciprocating engine.

Present engine control systems often include misfire detection systems. As emission standards become increasingly stringent, there is a need for accurate misfire detection and reporting under all engine operating conditions.

Monitoring crankshaft engine angular velocity and crankshaft acceleration are preferred techniques for detecting misfires of individual cylinder firings during engine operation. Both of these measurements depend largely upon engine torque produced during the combustion process to determine misfiring of particular engine cylinders. Given the velocity or acceleration information, misfires are predicted by various signature analysis and/or spectral analysis methods.

Several present misfire detection systems are well suited for detecting misfires in low data rate applications. Low data rate systems typically seek to detect misfires based on entire cylinder event intervals as measured by, for example, the profile ignition pulse (PIP) signal. In a four cylinder engine, the PIP signal actually indicates the approach to top dead center of two engine cylinders, one of which is approaching a power stroke and one of which is approaching an intake stroke. This is so because it takes two full crankshaft rotations to complete an engine cycle. In engines having more than four cylinders, however, the power strokes of different cylinders will overlap. Accordingly, associating crankshaft acceleration fluctuations with any particular cylinder becomes more difficult because the firing induced crankshaft accelerations occur over smaller rotational angles.

Accordingly, in engines having more than four cylinders, it is desirable to monitor average crankshaft acceleration over smaller crankshaft rotational intervals for improved misfire detection. As a practical matter, however, the engine angular velocity and acceleration behavior is also affected by powertrain-related behaviors other than firing torque. These other conditions can significantly reduce the signal-noise ratio of the firing torque-related velocity or acceleration signal under analysis. In addition, under certain engine operating conditions, the noise exceeds the engine torque-related velocity or acceleration signal under analysis. Moreover, noise is introduced into the crankshaft acceleration signal due to crankshaft torsional vibrations, inertial torque due to reciprocating masses, and other mechanically induced vibrations on the engine's crankshaft. This noise can hide or mask any signatory behavior of a misfire event.

One example of a high data rate misfire detection system with improved signal fidelity is disclosed in U.S. Pat. No. 5,515,720. In that patent, the improved fidelity acceleration signal is provided by a median filter operating on an acceleration signal where the median filter's rank is programmable dependent upon the determined operating condition of the engine.

The data stream relied upon by such high data rate systems, however, comprise interlaced non-homogeneous data points. Accordingly, crankshaft acceleration signatures based upon such data can mask or hide misfire events. In other words, when data is sampled at higher rates, i.e., at smaller crankshaft rotational angles, the samples are interlaced and represent different portions of the engine cycle. When these interlaced non-homogeneous samples are coupled with heuristic-type filters, such as a median filter which is designed to determine some root nature of a signal or the difference between the measured value and the root nature of a signal, errors are often introduced. In addition, if the signal is modified prior to being operated upon by these rule-based filters, the root nature of the signal is also modified.

Accordingly, there is a need for an improved misfire detection system and method which accounts for the small non-homogeneous angular sampling period of high data rate systems and the complications associated with interlaced data in heuristic-type filters in determining deviant accelerations or velocities to identify loss of combustion quality in internal combustion engines.

SUMMARY OF THE INVENTION

An object of the present invention is to provide an improved misfired detection system and method.

The present invention is advantageous in that it accounts for errors introduced by second mode torsional vibration characteristics, the small non-homogeneous angular sampling period of high data rate systems, data skewing due to preprocessing such as low pass filtering, and problems associated with processing interlaced data in heuristic-type filters.

In one aspect of the invention, a method of detecting misfires of individual cylinder events in an internal combustion engine is disclosed which includes the step of generating a velocity signal indicative of the torque behavior of the engine wherein the velocity signal comprises non-homogeneous interlaced data sets. The velocity signal is then filtered and separated into a plurality of non-interlaced homogeneous data sets wherein each of the data sets represents like portions of the internal combustion engine cycle. A median filter is then applied to each of the plurality of non-interlaced homogeneous data sets. The data sets are then re-interlaced, and a misfire indication is provided as a function of the re-interlaced velocity signal. In one aspect of the invention, the applied median filter is a recursive median filter.

Another advantage of the present invention is that by separating the velocity signal into distinct non-interlaced homogeneous data sets, the data sets can be normalized. Once this data has been de-interlaced according to the applied heuristic, it can then be operated on by heuristic-type filters such as a median filter, mean filter, or logic filter. Since the effect of these heuristic-type filters is to normalize a data set according to the applied heuristic, the corresponding outputs of each homogeneous data set will be centered about the heuristic. This centering effect allows the signals to be recombined after the heuristic is applied since each data set will be centered about its relative zero. Thus, the nature of any deviations (i.e., misfires) is maintained.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF A PREFERRED EMBODIMENT

Figure 1:
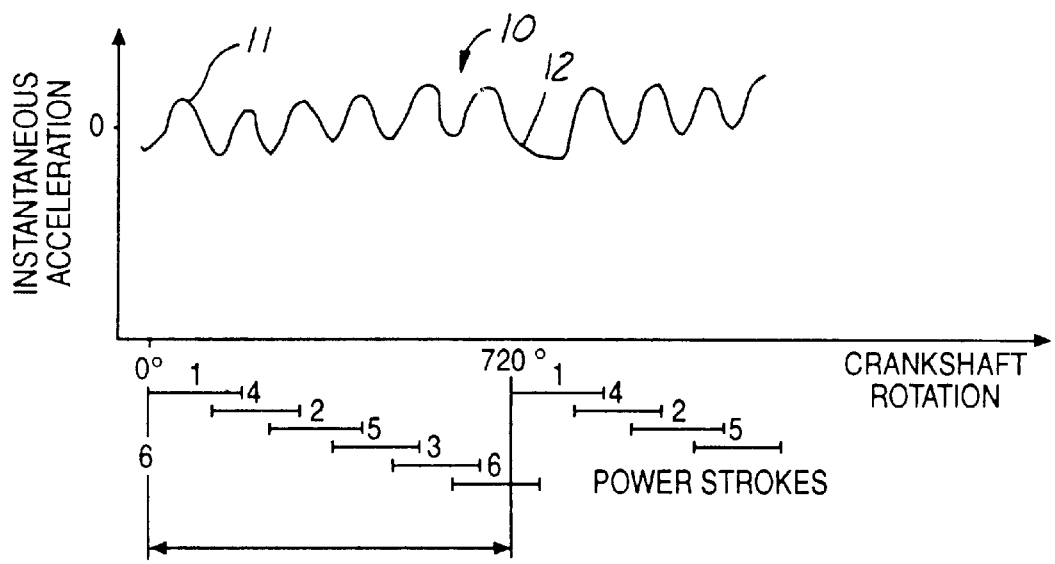
FIG. 1 is a graph showing instantaneous acceleration versus crankshaft rotation for normal and misfiring cylinders.

In the typical four-stroke combustion engine, the four strokes include the intake stroke, the compression stroke, the power stroke, and the exhaust stroke. As shown in FIG. 1, the power strokes of the respective cylinders are arranged in a particular order according to crankshaft position. Furthermore, in any engine having more than four cylinders such as the six cylinder engine shown, the power strokes of different cylinders will overlap. This smoothes the crankshaft velocity and acceleration profile, but makes misfire detection associated with a particular cylinder more difficult. As can be seen in FIG. 1, one engine cycle is comprised of 720° of crankshaft rotation during which each cylinder passes through each of its four strokes.

Curve 10 in FIG. 1 shows approximate acceleration fluctuation during engine operation. An acceleration peak 11 occurs during the firing interval of cylinder no. 1 and other maximums in the acceleration curve occur approximately corresponding to each other properly firing cylinder. When a misfire occurs such that no significant power is created by a cylinder during its firing interval, the crankshaft decelerates as indicated at 12.

Figure 2:
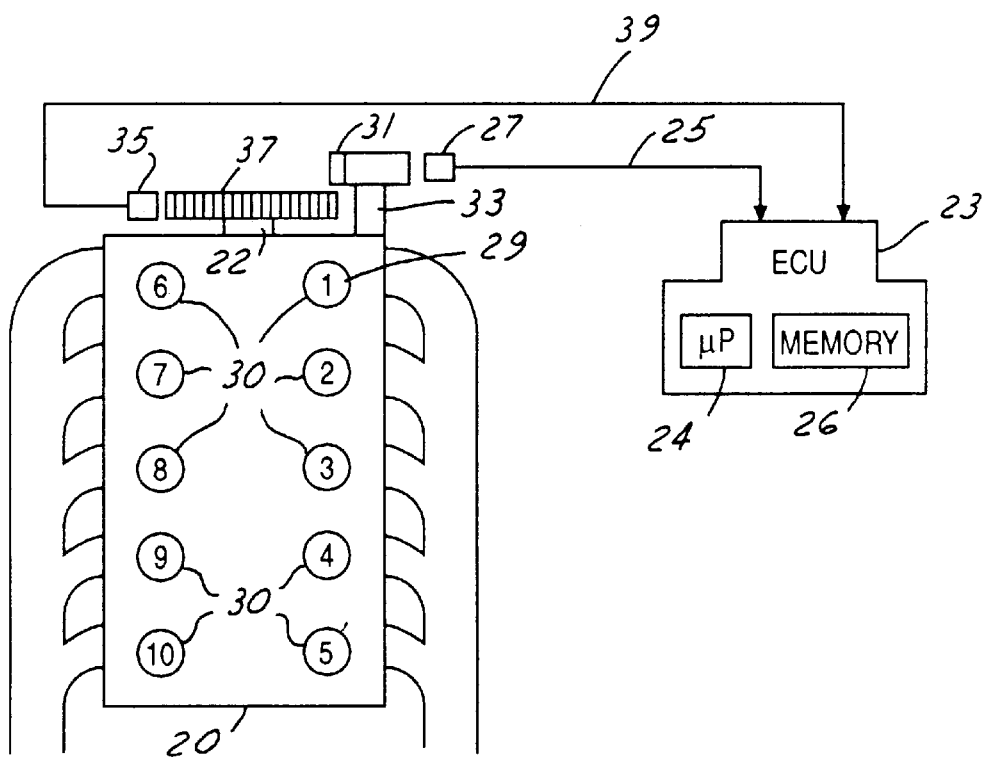
FIG. 2 is a schematic diagram illustrating crankshaft acceleration data collection in accordance with one embodiment of the present invention.

One embodiment of a high data rate system for gathering crankshaft velocity data is shown in FIG. 2. FIG. 2 shows a ten cylinder engine 20 with a crankshaft 22. A related engine control unit (ECU) 23 includes an input for receiving a top dead center (TDC) signal 25 from a camshaft rotational sensor 27 which indicates a TDC of cylinder no. 1 #29 of the ten cylinders 30 of the engine 20. This TDC signal 25 is provided responsive to measuring a lobe 31 on the end of a camshaft 33. This camshaft rotational sensor 27 provides the TDC signal 25 to the ECU 23 every 720° of crankshaft angular rotation. The TDC signal 25 is used by the ECU 23 to determine a starting point for measuring which of the cylinders 30 is currently firing and thus causing acceleration of the engine's crankshaft 22.

Another input to the ECU 23 is provided by an engine angular displacement sensor 35. This sensor measures engine angular displacement by sensing a tooth wheel 37 mounted on the engine's crankshaft 22. The engine angular displacement sensor 35 provides an engine angular displacement signal 39 to the ECU 23 every 18° of engine crankshaft rotation based on a tooth-space pattern on the toothed wheel 37. The engine angular displacement signal 39 is used by the ECU 23 to measure engine angular velocity, crankshaft acceleration, and also to identify the active cylinder in case of a misfire.

The ECU 23 includes a central processing unit (CPU) such as a microprocessor 24 and associated memory 26. The microprocessor 24 converts the signals 25 and 39 from pulses to digital information representative of the information contained in the pulses used later in the executed method steps.

Figure 3:
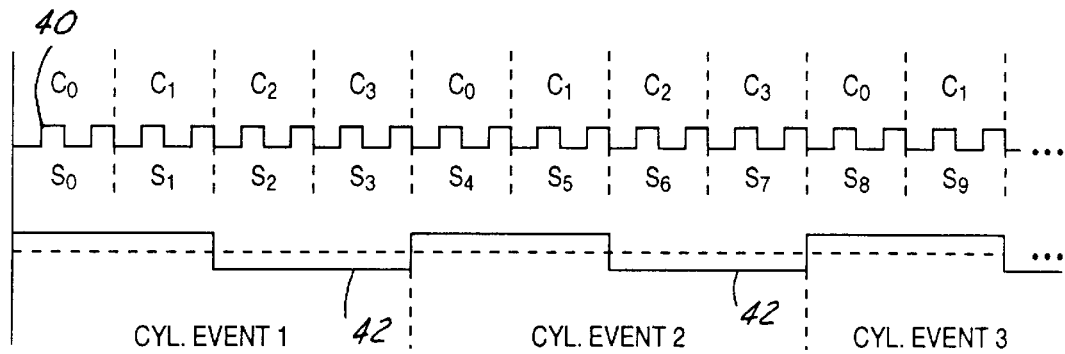
FIG. 3 is a graph showing data points in a high data rate system and corresponding cylinder events.

FIG. 3 is a graph of the high data rate stream of information from which crankshaft velocity and acceleration are determined. The graph 40 represents the engine angular displacement signal 39 resulting from the engine angular displacement sensor 35 and toothed wheel 37 for the engine 20 of FIG. 2. As shown in FIG. 3, the engine angular displacement signal can be represented by a scuare wave signal 40 with edges corresponding to crankshaft angle. These edges are time-stamped at a given clock resolution which corresponds to some fixed angular interval of rotation. This angular interval is then divided by the time interval to determine a measured angular velocity. For a ten cylinder engine having a "40-1" toothed wheel, each combustion event 42 can be represented by four data samples ($s_0$-$s_3$, $s_4$-$s_7$, etc.) wherein each data sample represents 18° of angular rotation (i.e., 360° divided by 20 samples per wheel revolution).

The crankshaft velocity signal is subject to many sources of variation, however. These include, but are not limited to the characteristics of the rotational interval (e.g., intake, compression, combustion, exhaust); the cylinder-to-cylinder combustion variations; the torsional vibrations of the crankshaft; the characteristics of balance mechanisms; and drive cycle variations.

To remove these variations from the velocity signal, different filtering algorithms can be employed. These include low pass, band pass, or high pass filters depending upon the desired output. These filters introduce a smearing effect on the signal, however, which may not be desirable, and may affect a single measured sample or, under strong attenuation, many samples. This smearing alters the fundamental or root nature of the input signal and results in an altered filtered velocity signal. If this skewed signal or its derivatives are heuristically filtered, such as with a median filter, the root signal may be difficult to obtain and, therefore, the difference of any measured signal from that root signal may be less than optimal. This error can be demonstrated with reference to FIG. 4.

Figure 4:
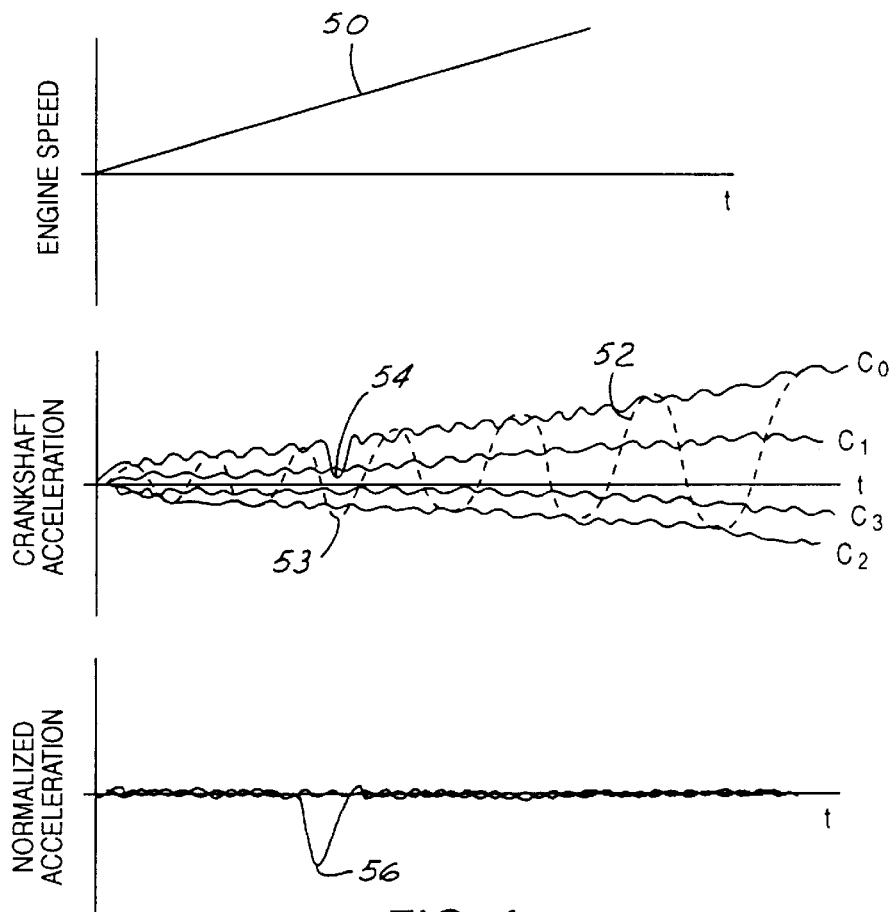
FIG. 4 is a series of graphs illustrating non-interlaced homogeneous crankshaft acceleration data sets, and normalized non-interlaced homogeneous crankshaft acceleration data sets.

FIG. 4 graphically represents the crankshaft acceleration based upon the interlaced and non-interlaced data sets of FIG. 3. As the engine speed increases as shown at 50, the engine angular displacement signal 40 (FIG. 3) can be low pass filtered and median filtered to determine a root signal of crankshaft acceleration 52. The acceleration signal 52, however, represents a non-homogeneous interlaced data set. It is non-homogeneous in that the resulting signal 52 represents different portions of the cylinder events. In other words, $C_0$ represents a different portion of the cylinder event than $C_1$, and so on. Because the data stream is non-homogeneous, it inherently contains noise which can mask or hide a misfire event shown as 53 in the crankshaft acceleration signal 52.

The present invention reduces the effects of velocity variations associated with the interlaced non-homogeneous data by normalizing the crankshaft acceleration signal. This is accomplished by sampling the interlaced non-homogeneous data stream 40 at only the crankshaft intervals of interest, or splitting data into channels wherein the samples in each channel correspond to homogeneous data sets based on like cylinder events or intervals.

As shown in FIGS. 3 and 4, each cylinder event 42 can be divided into four channels $C_0$, $C_1$, $C_2$, $C_3$. A plot of the crankshaft acceleration with respect to each individual channel is shown in FIG. 4 as $C_0$-$C_3$. Once the data has been de-interlaced, it can then be operated on by a heuristic-type filter, such as a median filter, mean filter, or logic filter. Since the effect of these heuristic-type filters is to normalize a data set according to the applied heuristic, the corresponding outputs of each channel are centered about the heuristic. This centering effect allows the signals to be recombined after the heuristic is applied, as shown in normalized acceleration profile of FIG. 4. Since each channel is centered about its relative zero, the nature of any deviations will be maintained. This is shown, for example, by the deceleration 54 of channel $C_0$ which was masked in the acceleration signal 52 resulting from the interlaced non-homogeneous data set. As can be seen, the deviation is readily apparent as deviation 56 in the normalized and recombined homogeneous non-interlaced data sets. Once the signals are recombined in this manner, additional computations may be performed or the signal may be compared to thresholds to detect deviations representing misfire events.

Figure 5:
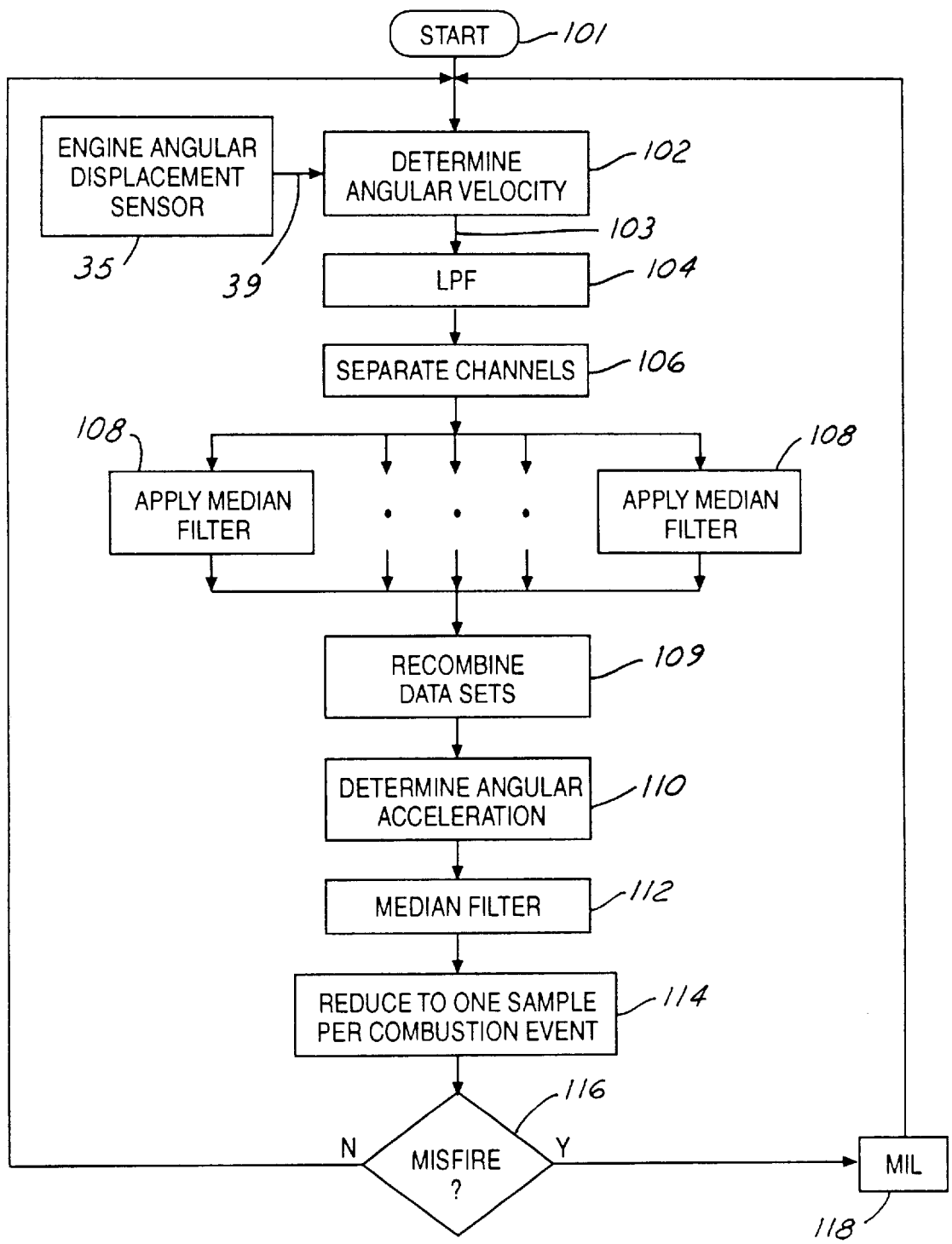
FIG. 5 is a flow diagram illustrating various method steps for detecting misfire in accordance with one embodiment of the present invention.

One embodiment of the method steps required to detect misfires based upon the method described above is shown in FIG. 5. These method steps are continuously executed and start with step 101. In the preferred embodiment, the logic routine of FIG. 5 resides in the memory 26 of the ECU 23 as executed by the microprocessor 24 (FIG. 2). Of course, the logic could be executed by any peripheral device which may or may not reside in the ECU 24.

In block 102, the engine angular displacement signal 39 is received from the engine angular displacement sensor 35 (FIG. 2) and is used to derive the angular velocity of the engine's crankshaft. This is a function of the known angular spacing of the teeth on the toothed wheel, and the time measured between the teeth. As mentioned above, this velocity signal 103 is subject to many sources of variation. To remove some variations from the velocity signal 103, a filtering circuit is used in block 104. In this case, an order programmable low pass filter is used to attenuate the crankshaft torsional vibrations, inertial torque due to reciprocating masses, and other mechanically induced vibrations on the engine's crankshaft. The programmable low pass filter's order can be made variable as a function of engine speed and load to improve signal fidelity as is known in the art so that misfire detection capability can be enhanced.

In order to further improve the signal characteristics before determining the crankshaft angular acceleration, the interlace data stream is split into separate channels at block 106. Once separated, each channel corresponds to a homogeneous data set based on some apriori knowledge, such as similar crankshaft angles, common engine cycle elements, or common torsional effects. For example, as shown in FIG. 3, for a ten cylinder engine, channel $C_0$ would represent the first 18° of rotation after TDC for each cylinder, channel $c_1$, represents the next 18° of rotation, etc. In this manner, it is desirable to analyze like channels from cylinder event to cylinder event to detect deviations characteristic of misfires. Thus, the data set comprising all like channels, such as $c_0$ is referred to as a homogeneous non-interlaced data set.

In this case, the first heuristic applied separates the data into homogeneous non-interlaced data sets. For misfire detection, in this example, each of these data sets represents a similar portion of different cylinder events. In a similar manner, a different heuristic could, for example, separate the data sets to correspond to the intake valve opening of each cylinder.

Once this data has been de-interlaced according to the applied heuristic at block 106, it can then be operated on by heuristic-type filters, such as a median filter, at step 108. A median filter is applied to each of the channels to normalize the data set and center the corresponding outputs. This centering effect allows the channels to be recombined in step 109 after the median filter is applied so that deviations can be maintained and misfires can be detected.

After the channels are recombined or re-interlaced at step 109, the crankshaft angular acceleration is determined at step 110.

Alternatively, the reinterlaced data sets resulting from step 109 can be compared to threshold values to detect deviations representative of misfires. For improved misfire detection, however, it is preferable to determine the angular acceleration at step 110 and further processes the acceleration signal by a recursive median filter of selectable rank in step 112. Furthermore, the rank of the recursive median filter may be made dependent upon the pattern of misfire characteristic of he engine under analysis.

Once the median filter has been applied in step 112, the oversampled data is reduced to one sample per combustion event such that a misfire can be associated with a particular cylinder. This is shown in step 114.

At step 116, the data point is compared to a calibrated threshold value. If the data point deviates from the expected crankshaft acceleration by more than the calibrated threshold amount, it is determined to be a misfired event.

For engine diagnostic purposes, misfire events are commonly stored in ECU memory 26. In addition, if misfires occur as a substantial percentage of all cylinder events, a malfunction indicator light can be activated at step 118 to alert the operator.

In the misfire detection scheme just described, it is important that the median filter applied at step 108 converge to the root signal as quickly as possible. This allows the system to get to the root signal with the minimal number of computational steps. This is desirable if the system is to run in real-time. For this reason, the median filter applied at step 108 is preferably a recursive median filter. One characteristic of a recursive filter is its rapid convergence to the root signal. As the name implies, in a recursive median filter, the filter output is fed back into the filter input For example, in a median filter having an odd number of sorted sample values, the mid or median value is used as the filter output. Thus, the output of a median filter y(A) is given by:

$$y(A) = \text{median values of } [x(A-N), \ldots, x(A-1), x(A), x(A+1), \ldots, x(A+N)]$$

wherein N represents half the rank of the median filter and A is an index into the data stream.

A recursive median filter, however, is defined by the following operation:

$$y(A) = \text{median value of } [y(A-N), \ldots, y(A-2), x(A), x(A+1), \ldots, x(A+N)]$$

In this manner, the output y(A) is fed back into the filter allowing the recursive operation to generate a root output in a single pass through the data stream.

Similarly, the median filter applied in step 112 is also preferably a recursive median filter of selectable rank. This is to create an enhanced difference between the median filtered acceleration values and the measured values. It will be seen that the present invention overcomes the drawbacks associated with processing interlaced non-homogeneous data points which are commonly associated with high data rate misfire detection systems. While the invention has been described in connection with one or more embodiments, it will be understood that the invention is not limited to those embodiments. For instance, the method steps of de-interlacing, filtering and re-interlacing (steps 106, 108, 109) could be performed at different or multiple times in the process. Specifically, these steps could be performed on the raw high data rate signal or the angular velocity signal prior to filtering (step 104). Alternatively, these steps could be performed after the angular acceleration has been determine (step 110). Furthermore, these steps could be repeated in place of the median filter (step 112) depending upon the characteristic desired to be detected. Thus, the invention covers all alternatives, modifications, and equivalents, as may be included within the spirit and scope of the appended claims.

What is claimed is:

1. A method of detecting misfires associated with individual cylinders of an internal combustion engine comprising the steps of:

generating a velocity signal indicative of the torque behavior of said engine, said velocity signal comprising a non-homogeneous interlaced data set;

filtering said velocity signal;

separating said velocity signal into a plurality of homogeneous non-interlaced data sets wherein each of said data sets represent like portions of the internal combustion engine cycle;

applying a median filter to each of said plurality of homogeneous non-interlaced data sets;

re-interlacing said plurality of homogeneous non-interlaced data sets to result in a normalized, filtered velocity signal indicative of the torque behavior of said engine; and providing a misfire indication as a function of said re-interlaced velocity signal.

2. The method as set forth in claim 1 wherein the step of filtering said velocity signal includes the step of low pass filtering said velocity signal.

3. The method as set forth in claim 1 wherein the step of applying a median filter includes the step of applying a recursive median filter to each of said plurality of homogeneous non-interlaced data sets.

4. The method as set forth in claim 1 wherein the step of applying a median filter includes the step of applying a recursive median filter having variable rank dependent upon the misfire characteristics of said engine to each of said plurality of homogeneous non-interlaced data sets.

5. The method as set forth in claim 1 wherein the step of providing a misfire indication includes the step of comparing the re-interlaced velocity signal to a calibrated threshold indicative of a cylinder misfire.

6. The method as set forth in claim 1 wherein the step of providing a misfire indication includes the step of applying a median filter to said re-interlaced velocity signal to result in a crankshaft acceleration signal.

7. The method as set forth in claim 6 wherein the step of providing a misfire indication further includes the step of reducing the crankshaft acceleration signal to a single data point per combustion event.

8. The method as set forth in claim 7 wherein the step of providing a misfire indication further includes the step of comparing said single data point to a calibrated threshold indicative of a cylinder misfire.

9. Apparatus for detecting misfires occurring during individual cylinder events of a multi-cylinder combustion engine comprising:

a crankshaft rotation sensor;

a processor for measuring engine acceleration corresponding to each of a plurality of cylinder events during operation of said engine, said processor programmed to:

generate a velocity signal indicative of the torque behavior of said engine, said velocity signal comprising a non-homogeneous interlaced data set;

filter said velocity signal;

separate said velocity signal into a plurality of homogeneous non-interlaced data sets wherein each of said data sets represent like portions of the internal combustion engine cycle;

apply a recursive median filter to each of said plurality of homogeneous non-interlaced data sets;

re-interlace said plurality of homogeneous non-interlaced data sets to result in a normalized, filtered velocity signal indicative of the torque behavior of said engine; and provide a misfire indication signal as a function of said re-interlaced velocity signal; and memory for storing said misfire signal.

10. A method of improving the signal fidelity of an acceleration-based misfire detection system of a combustion engine comprising the steps of:

determining a velocity signal indicative of a plurality of consecutive cylinder events during operation of said engine;

filtering said velocity signal;

separating said velocity signal into a plurality of homogeneous non-interlaced data sets wherein each of said data sets represent like portions of the engine cycle;

applying a recursive median filter to each of said data sets; and re-interlacing said data sets to achieve a normalized velocity signal.

11. The method as set forth in claim 10 wherein the step of filtering the velocity signal includes the step of low pass filtering said velocity signal through a finite impulse response filter.

12. The method as set forth in claim 11 wherein the step of applying a recursive median filter to each of said data sets includes the step of applying a recursive median filter having a variable rank dependent upon the misfire characteristics of said engine to each of the data sets.

* * * * *